(No Model.)
W. H. BASHAM.
COTTON SCRAPER.
No. 351,018. Patented Oct. 19, 1886.
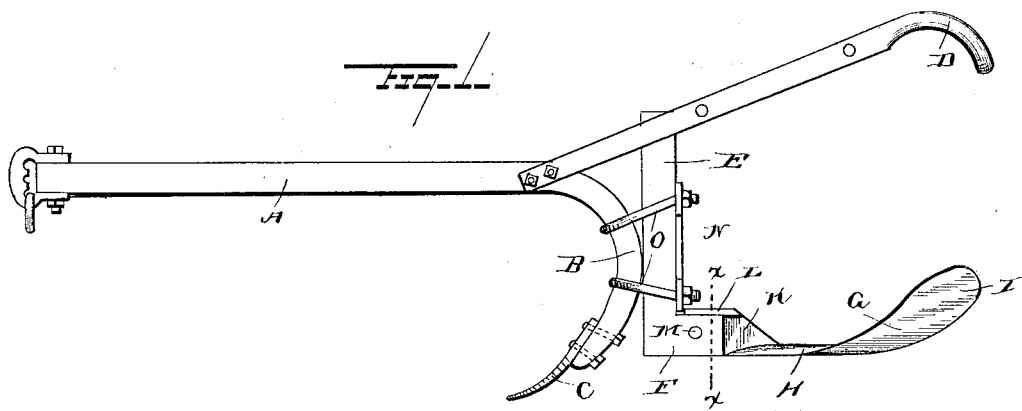
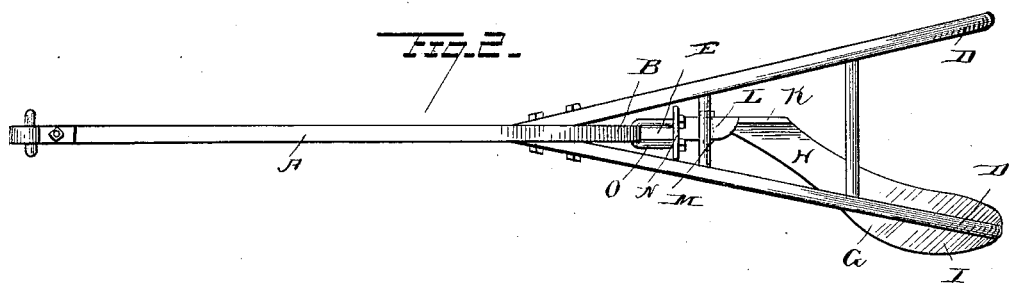
Witnesses
W. T. Gill
J. C. O'Gannon
Inventor
W. H. Basham
By his Attorneys
R. A. Snow & Co.

UNITED STATES PATENT OFFICE.

WESLEY HOUSTON BASHAM, OF GLEN ROSE, TEXAS.

COTTON-SCRAPER.

SPECIFICATION forming part of Letters Patent No. 351,018, dated October 19, 1886.

Application filed July 13, 1886. Serial No. 207,921. (No model.)

*To all whom it may concern:*

Be it known that I, WESLEY HOUSTON BASHAM, a citizen of the United States, residing at Glen Rose, in the county of Somervell and State of Texas, have invented a new and useful Improvement in Cotton-Scrapers, of which the following is a specification.

My invention relates to an improvement in cotton-scrapers; and it consists in the peculiar construction and combination of devices that will be more fully set forth hereinafter, and particularly pointed out in the claims.

In the drawings, Figure 1 is an elevation of a cotton-scraper embodying my improvements attached to a single-shovel cultivator. Fig. 2 is a top plan view of the same. Fig. 3 is a detail transverse section taken on the line $x$ $x$ of Fig. 1.

This invention is adapted to be attached to either a single or double shovel cultivator, or to a turning-plow. As a matter of convenience, I have illustrated the cotton-scraper in the accompanying drawings as attached to a single-shovel cultivator.

A represents the beam of the cultivator. B represents the curved standard formed at the rear end of the beam.

C represents the shovel or plow, and D represents the handles which are attached to the beam, all being constructed in the usual manner.

E represents a vertical standard or bar, which is provided at its lower end with a rearward-extending arm, F.

G represents the cotton-scraper, which comprises a diagonally arranged wing, H, having at its outer end a curved upturned broadened blade, I. The front end of the wing is bent vertically, as at K, and is provided at its upper edge with a laterally-extending flange, L.

In order to attach the cotton-scraper to the standard E the front end, K, of the scraper is placed against one side of the arm F, with the flange L bearing on the upper side of the said arm. A transverse bolt, M, extends through the arm F and the front portion, K, of the cotton-scraper to secure the latter to the said arm. The standard E is secured to the rear side of the plow-standard in a vertical position by means of a plate, N, which is placed on the rear edge of the standard E, and clip-bolts O, which are passed around the front sides of the plow-standards, embrace the standard E, and have their rear threaded ends passed through openings made in the ends of the plate N, and provided with clamping-nuts, as shown. By loosening the said nuts the standard E may be adjusted vertically with relation to the plow, and secured at any desired adjustment by again tightening the nut. It will be observed that the cotton-scraper projects laterally and rearwardly from the plow, and is thus caused to run directly alongside the row of cotton-plants.

When the cotton-scraper is attached to a turning-plow, it projects laterally in rear of the mold-board.

The cotton-scraper may be fashioned so as to fit either a right or a left hand plow.

Having thus described my invention, I claim—

1. The combination, with the standard E, having the rearward-extending arm F at its lower end, of the cotton-scraper having the rearwardly and outwardly extending wing H, having the upturned broadened blade I at its rear end and the vertical portion K at its front, adapted to bear against one side of the arm F, and having the flange L to bear against the upper edge of the said arm, substantially as described.

2. The combination, with the cultivating-plow, of the vertical standard E, having the horizontal rearwardly-extending arm F at its lower end, the cotton-scraper attached to the said arm and extending rearwardly and outwardly therefrom, and having the upturned curved broadened rear end forming the blade I, and the clip-bolts O and clamping-plate N, to secure the standard E to the plow-standard and permit the said standard E to be vertically adjusted, substantially as described.

In testimony that I claim the foregoing as my own I have hereto affixed my signature in presence of two witnesses.

WESLEY HOUSTON BASHAM.

Witnesses:
JAS. W. VINCENT,
J. B. EARLY.